US011282231B2

(12) United States Patent
Barbour

(10) Patent No.: US 11,282,231 B2
(45) Date of Patent: Mar. 22, 2022

(54) CAMERA RIG WITH MULTIPLE SENSORS

(71) Applicants: Sony Group Corporation, Tokyo (JP); SONY PICTURES ENTERTAINMENT INC, Culver City, CA (US)

(72) Inventor: Scot Barbour, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/714,428

(22) Filed: Dec. 13, 2019

(65) Prior Publication Data

US 2020/0202570 A1 Jun. 25, 2020

Related U.S. Application Data

(60) Provisional application No. 62/784,242, filed on Dec. 21, 2018.

(51) Int. Cl.
*G06T 7/80* (2017.01)
*H04N 17/00* (2006.01)
*H04N 5/247* (2006.01)

(52) U.S. Cl.
CPC .............. *G06T 7/80* (2017.01); *H04N 5/247* (2013.01); *H04N 17/002* (2013.01)

(58) Field of Classification Search
CPC ........ H04N 5/33; H04N 13/246; H04N 13/25; H04N 7/188; H04N 13/111; H04N 13/243; H04N 13/254; H04N 17/002
See application file for complete search history.

(56) References Cited

U.S. PATENT DOCUMENTS

| | | | |
|---|---|---|---|
| 6,377,700 B1 * | 4/2002 | Mack | H04N 13/207 382/154 |
| 7,924,312 B2 | 4/2011 | Packard | |
| 10,027,948 B2 | 7/2018 | Cole et al. | |
| 2011/0216205 A1 * | 9/2011 | Flatt | H04N 9/3147 348/189 |
| 2016/0352982 A1 | 12/2016 | Weaver et al. | |
| 2017/0186146 A1 * | 6/2017 | Raniwala | H04N 13/25 |
| 2017/0295358 A1 | 10/2017 | Cabral et al. | |

* cited by examiner

*Primary Examiner* — Samira Monshi
(74) *Attorney, Agent, or Firm* — Procopio, Cory, Hargreaves & Savitch LLP

(57) ABSTRACT

Capturing data from a camera rig including a plurality of sensors to capture data during a capture period, including: a plurality of image sensors including at least a visible light sensor and an infrared (IR) sensor, the plurality of image sensors configured to have a common center line through a single lens; a plurality of light sources including a visible light source and an IR source, wherein the IR source projects an IR beam of a calibration pattern; and a processor coupled to the plurality of image sensors and the plurality of light sources, wherein the processor is configured to process data captured by the visible light sensor, and wherein the processor is configured to process data captured by the IR sensor.

15 Claims, 3 Drawing Sheets

CAMERA RIG WITH MULTIPLE SENSORS

CROSS-REFERENCE TO RELATED APPLICATIONS

This application claims the benefit of priority under 35 U.S.C. § 119(e) of U.S. Provisional Patent Application No. 62/784,242, filed Dec. 21, 2018, entitled "Camera Rig with Multiple Sensors." The disclosure of the above-referenced application is incorporated herein by reference.

BACKGROUND

Field

The present disclosure relates to capturing data from a camera rig, and more specifically, to capturing data from a same camera rig with multiple sensors and creating a common configuration for the multiple sensors.

Background

Having multiple sensors for a camera rig allows several different perspectives of the same source to be obtained. However, creating a common configuration for the sensors of the camera rig is not an easy task.

SUMMARY

The present disclosure provides for capturing data from a same camera rig with multiple sensors and creating a common configuration for the multiple sensors.

In one implementation, a system for capturing data from a camera rig including a plurality of sensors to capture data during a capture period is disclosed. The system includes: a plurality of image sensors including at least a visible light sensor and an infrared (IR) sensor, the plurality of image sensors configured to have a common center line through a single lens; a plurality of light sources including a visible light source and an IR source, wherein the IR source projects an IR beam of a calibration pattern; and a processor coupled to the plurality of image sensors and the plurality of light sources, wherein the processor is configured to process data captured by the visible light sensor, and wherein the processor is configured to process data captured by the IR sensor.

In one implementation, the data captured by the visible light sensor is processed to generate video image data. In one implementation, the data captured by the IR sensor is processed to generate calibration data for the camera rig. In one implementation, the IR source is configured to project the calibration pattern onto objects and people present within a capture volume. In one implementation, the data captured by the IR sensor is processed to generate geometry about the objects and people present within the capture volume. In one implementation, the visible light sensor comprises a red-green-blue (RGB) sensor. In one implementation, the processor is configured to direct the visible light source to project visible light and the IR source to project IR beam, during the entire capture period. In one implementation, the processor is configured to direct the visible light source to project visible light and the IR source to project IR beam, at different times during the capture period. In one implementation, the visible light sensor and the IR sensor are configured to at least partially overlap in position. In one implementation, the visible light sensor and the IR sensor are configured to be position within a single camera.

In another implementation, a method for capturing data from a camera rig with multiple sensors during a capture period and creating a common configuration for the multiple sensors is disclosed. The method includes: directing a visible light source to project visible light on objects and people present within a capture volume; directing a visible light sensor to capture the visible light; directing an IR source to project patterned IR beam on the objects and people within the capture volume; and directing an IR sensor to capture the patterned IR beam.

In one implementation, the visible light captured by the visible light sensor is processed to generate video image data. In one implementation, the patterned IR beam captured by the IR sensor is processed to generate geometry about the objects and people present within the capture volume. In one implementation, the patterned IR beam captured by the IR sensor is processed to generate calibration data for the camera rig. In one implementation, the calibration data includes changes in positions of the visible light sensor and the IR sensor. In one implementation, the calibration data includes changes in distortions of the patterned IR beam as a camera angle relative to surface changes. In one implementation, directing a visible light source and directing an IR source includes directing to project the visible light and the IR beam, during the entire capture period. In one implementation, directing a visible light source and directing an IR source includes directing to project the visible light and the IR beam, at different times during the capture period.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, although having multiple sensors for a camera rig allows several different perspectives of the same source to be obtained, creating a common configuration for the sensors of the camera rig is not an easy task.

Certain implementations of the present disclosure provide for systems and methods for capturing data from a same camera rig with multiple sensors and creating a common configuration for the multiple sensors. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation of the system, multiple sensors and sources are integrated using a processor to create a common configuration for the camera rig. In one implementation, at least two sensors and at least two light sources are used to capture image data for video image data and calibration data. The system also includes a processor coupled to the sensors and the light sources to control their operation and send and receive data.

One implementation includes one or more programmable processors and corresponding computer system components to store and execute computer instructions, such as to integrate the multiple sensors and sources to generate a common configuration for the camera rig.

Example implementations for capturing data from the same camera rig with multiple sensors and sources to create a common configuration for the multiple sensors are shown below. All features of each example are not necessarily required in a particular implementation. Examples of additional software are also indicated to address certain features, but these are not necessarily required. Other solutions can also be used (e.g., off the shelf or custom).

Figure 1:
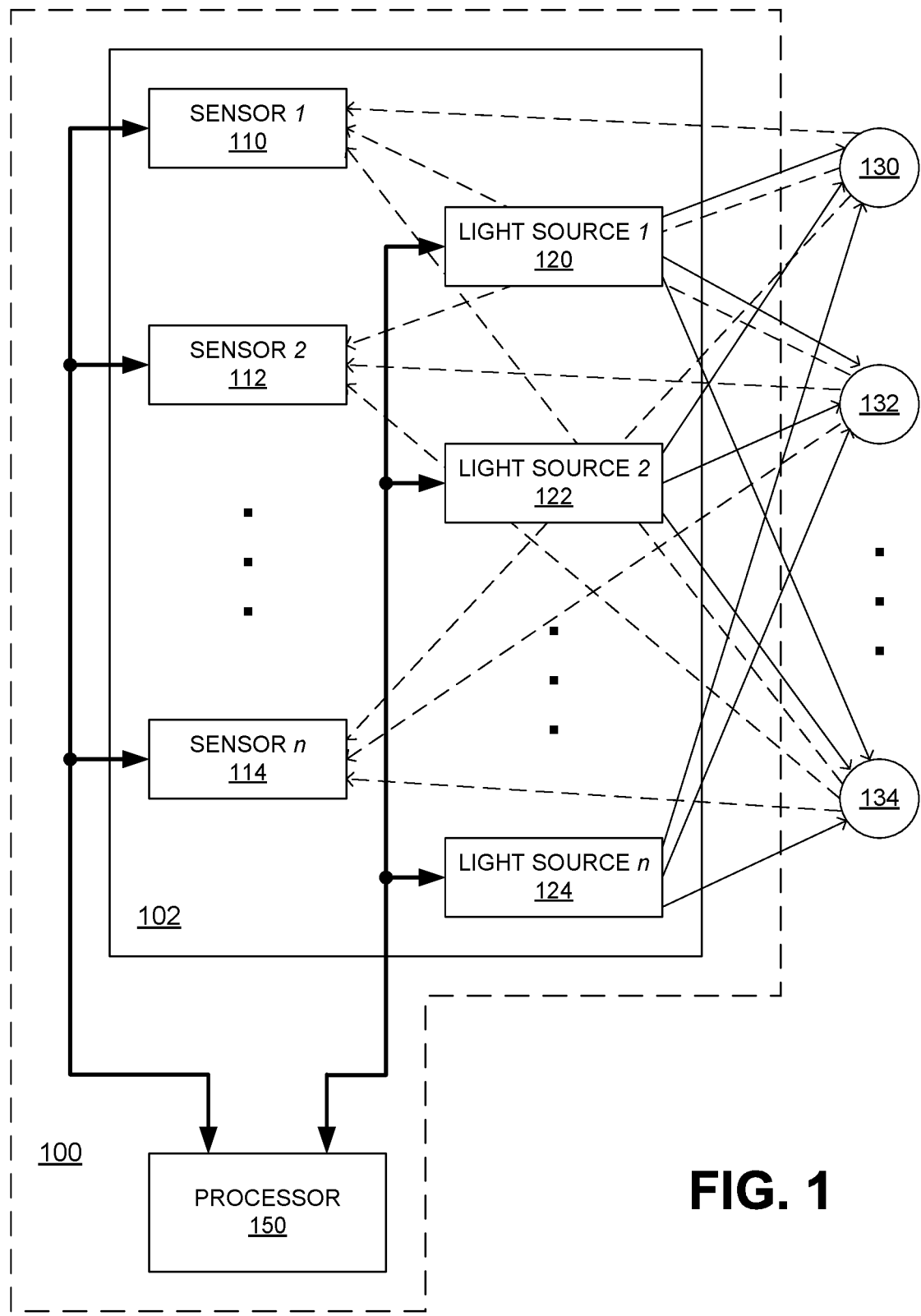
FIG. 1 is a block diagram of a system for capturing data from the same camera rig with multiple sensors and creating a common configuration for the multiple sensors in accordance with one implementation of the present disclosure.

FIG. 1 is a block diagram of a system 100 for capturing data from the same camera rig with multiple sensors and creating a common configuration for the multiple sensors in accordance with one implementation of the present disclosure. In the illustrated implementation of FIG. 1, the system 100 includes a camera rig 102 having a plurality of sensors 110, 112, 114 and a plurality of light sources 120, 122, 124 are used to capture image data for video image data and calibration data. The system 100 also includes a processor 150 coupled to the sensors 110, 112, 114 and the light sources 120, 122, 124 to control their operation and send and receive data.

In one implementation, the camera rig 102 for 3-D video capture includes at least two image sensors, a visible light sensor 110 (e.g., a red-green-blue (RGB) sensor) and an infrared (IR) sensor 112. In this implementation, the two sensors are overlapping and have a common center line through a single lens. The camera rig 102 also includes at least two light sources, a visible light source 120 and an IR source 122 (or the light sources can be external to the rig).

In one implementation, the light sources 120, 122, 124 are configured to illuminate objects and/or people 130, 132, 134 within a capture volume. In one implementation, the visible light source 120 is configured to project visible light for image capture, while the IR source 122 is configured to project structured or patterned IR beam for additional information capture. Further, the visible light sensor 110 is configured to capture video image data of the visible light, while the IR sensor 112 is configured to capture IR calibration pattern projected by the IR source 122.

In one implementation, the IR source 122 projects patterned IR beam, such as checkerboard patterns. Further, the IR sensor 112 captures image data of the projection of the checkerboard patterns onto the surfaces of the objects and/or people 130, 132, 134 as the secondary image capture. In one implementation, the processor 150 processes the secondary image capture to obtain information (e.g., geometry) about objects and/or people (in the capture volume) onto which the checkerboard patterns were projected.

In another implementation, the visible light can interfere with calibration data. Thus, using calibration patterns projected with IR beam can be effective for camera calibration. By using two aligned image sensors, the calibration variables are reduced and calibration can be more efficient.

Thus, in this implementation, the processor 150 processes the secondary image capture to obtain information about the cameras/sensors, such as changes in camera/sensor positions based on changes in the image data for the projected checkerboard patterns (e.g., changes in the distortion of the checkerboard patterns as the camera angle relative to the surface changes).

In another alternative implementation, various sensor configurations are used. Two sensors can overlap in position, partially or completely. Some or all of the sensors include transparent portions or gaps so that an underlying sensor can capture data through the other sensor. Sensors can be placed within the same body. Mirrors can be used within the camera body. A single sensor array can have multiple sections that operate independently or include different components for different data capture. Data from different sections of a single sensor can be processed differently to derive different data (e.g., video data and motion data).

In another alternative implementation, more than two sensors or more than two types of sensors are used. In one implementation, the two sensors are in same camera.

Figure 2:
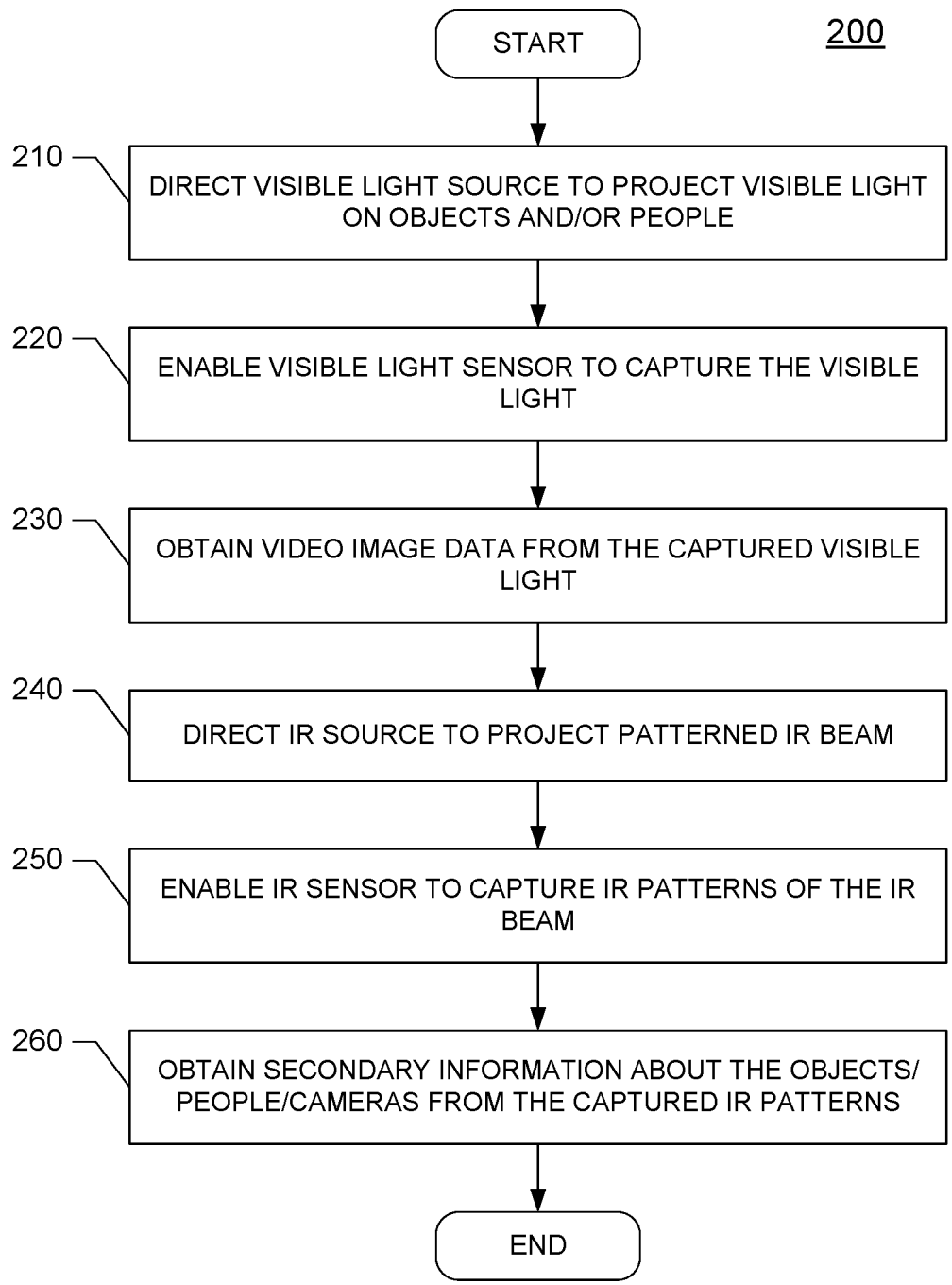
FIG. 2 is a flow diagram of a capturing process in accordance with one implementation of the present disclosure.

FIG. 2 is a flow diagram of a capturing process 200 in accordance with one implementation of the present disclosure. The capturing process 200 includes capturing data from a same camera rig with multiple sensors and creating a common configuration for the multiple sensors. In the illustrated implementation of FIG. 2, the process 200 includes steps performed by the processor 150 of the system 100.

As described above, in one implementation, the system includes a plurality of image sensors 110, 112, 114 and a plurality light sources 120, 122, 124. The plurality of image sensors 110, 112, 114 includes at least one visible light sensor 110 and one IR sensor 112, which are overlapping and have a common center line through a single lens. The plurality of light sources 120, 122, 124 includes at least one visible light source 120 and one IR source 122.

In the illustrated implementation of FIG. 2, the processor 150 is configured to direct the light sources 120, 122, 124 to illuminate objects and/or people within the capture volume. In one implementation, the visible light source 120 is directed, at block 210, to project visible light on the objects and/or people within the capture volume. The visible light sensor 120 is then directed to capture at least some light from the visible light, at block 220, and to obtain the video image data, at block 230, from the captured visible light.

In one implementation, the IR source 122 is directed, at block 240, to project a structured or patterned IR beam on the objects and/or people within the capture volume. The IR sensor 112 is then directed to capture IR calibration patterns projected by the IR source 122, at block 250, and to obtain the secondary information about the objects/people/cameras, at block 260, from the captured IR patterns.

In one implementation, the IR source 122 projects a patterned IR beam, such as checkerboard patterns, and the IR sensor 112 captures image data of the projection of the checkerboard patterns onto the surfaces of the objects and/or people. In one implementation, the processor 150 processes the secondary image capture to obtain information (e.g., geometry) about objects and/or people (in the capture volume) onto which the checkerboard patterns were projected. In another implementation, the processor 150 processes the secondary image capture to obtain information about the cameras/sensors, such as changes in camera/sensor positions based on changes in the image data for the projected checkerboard patterns (e.g., changes in the distortion of the checkerboard patterns as the camera angle relative to the surface changes).

In one implementation, the processor 150 is configured to direct the visible light source 120 to project visible light and the IR source 122 to project IR beam with a calibration pattern, during the entire capture period. Thus, in this implementation, the image data captured by the visible light sensor 110 during the entire capture period is used by the processor 150 for the video image data, while the image data captured by the IR sensor during the entire capture period is used by the processor 150 for the calibration data. Since the frequency spectrums of the visible light sensor 110 and the IR sensor 112 are different, the visible light sensor 110 does not capture the calibration pattern projected by the IR source and the IR sensor 112 does not capture the visible image from the projected visible light.

In another implementation, the visible light and the IR beam are projected at different times under the control of the processor 150. Thus, in this implementation, during the video capture period, the light sources 120, 122 alternate projections to create "light" periods and "black" periods. A "light" period refers to a visible brightness. A "black" period refers to a visible darkness. The visible light source projects visible light during the "light" periods. The IR source projects IR beam in a calibration pattern (e.g., a grid of lines) during the "black" periods. The frequency and duration of the periods is set by the characteristics of the sensors and light sources. For example, if the image sensors capture image data at 120 frames per second, then the periods are each ¹⁄₁₂₀ of a second long with 60 "light" periods and 60 "black" periods alternating during one second. The image data captured by the visible light sensor 110 during the "light" periods is used for video image data. The image data captured by the IR sensor 112 during the "black" periods is used for calibration data.

In an alternative implementation, various calibration patterns are used. Capturing an IR dot periodically offset from video capture frames can ensure the camera has not moved, or measure the movement.

Figure 3A:
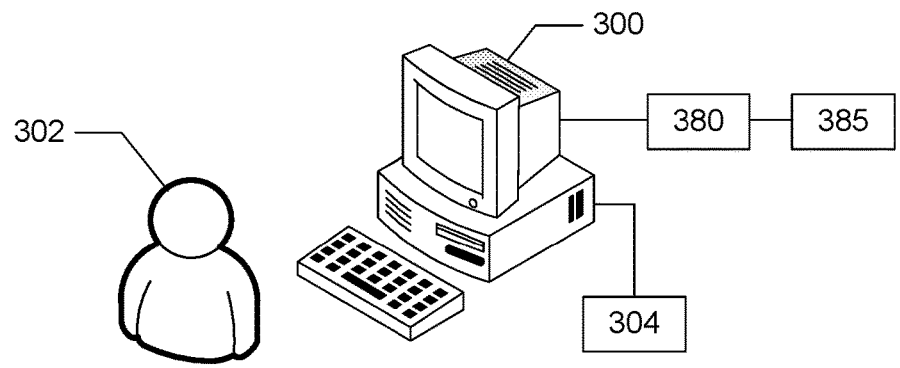
FIG. 3A is a representation of a capture system and a user in accordance with an implementation of the present disclosure.

FIG. 3A is a representation of a capture system 300 and a user 302 in accordance with an implementation of the present disclosure. The user 302 uses the computer system 300 to implement an image capture application 390 as illustrated and described with respect to the processor 150 in the system 100 of the block diagram shown in FIG. 1.

Figure 3B:
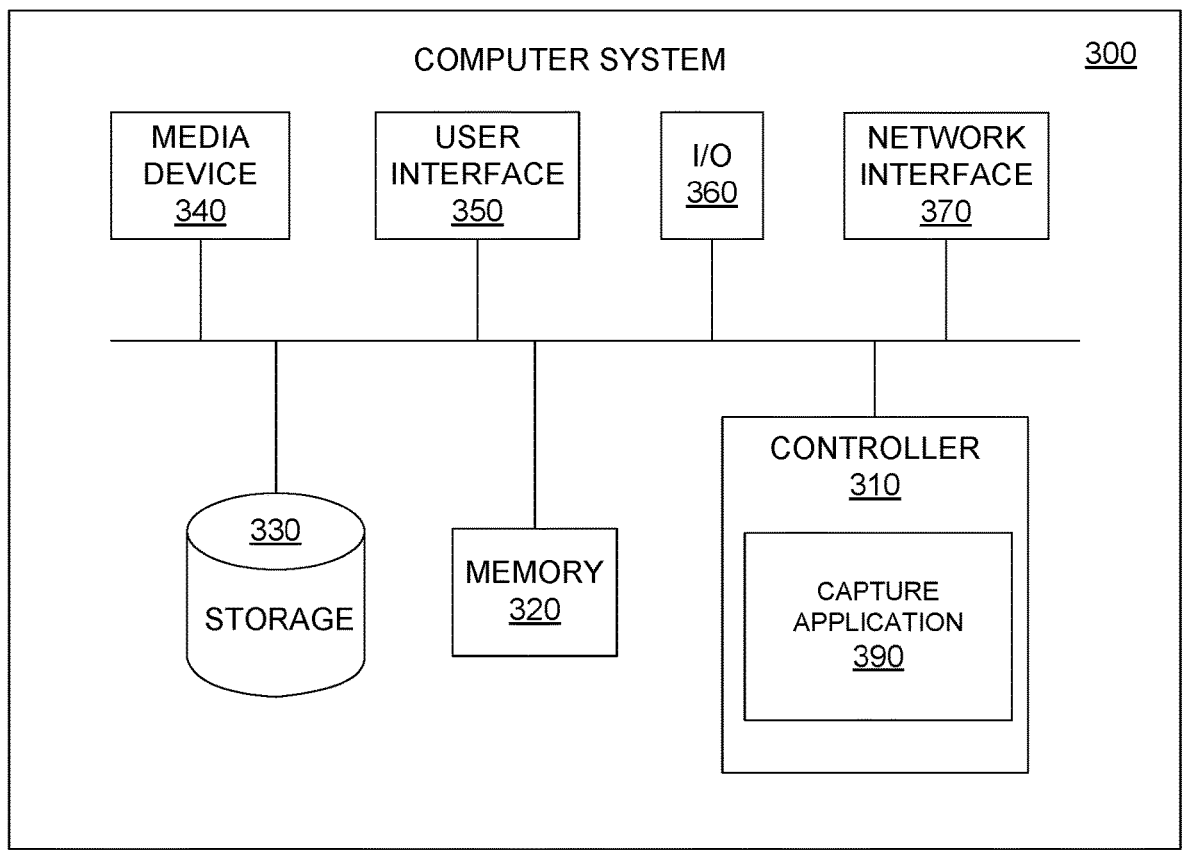
FIG. 3B is a functional block diagram illustrating the computer system hosting the capture application.

The computer system 300 stores and executes the image capture application 390 of FIG. 3B. In addition, the computer system 300 may be in communication with a software program 304. Software program 304 may include the software code for the image capture application. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the image capture application. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the capture application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the capture application 390 with a software system, such as to enable the creation and configuration of engines and data extractors within the capture application. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of computer system 300. For example, storage 330 stores data used by the capture application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above-described implementations are used in applications including camera systems for entertainment content, movies, television, or other applications such as personal use, games, security video, and medical imaging.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for capturing data from a camera rig including sensors to capture data during a capture period and creating a common configuration for the sensors, the system comprising:
   a plurality of light sources including a visible light source and an IR source,
   wherein the visible light source projects visible light on objects and people present within a capture volume,
   wherein the IR source projects an IR beam of a calibration pattern on the objects and people within the capture volume;
   a plurality of image sensors including at least a visible light sensor and an infrared (IR) sensor, the plurality of image sensors configured to have a common center line through a single lens,
   wherein the visible light sensor captures the visible light reflected from the objects and people,
   wherein the IR sensor captures the IR beams of the calibration pattern reflected from the objects and people, and
   a processor coupled to the plurality of image sensors and the plurality of light sources,
   wherein the processor is configured to process data captured by the visible light sensor, and
   wherein the processor is configured to process the IR beam of the calibration pattern captured by the IR sensor to generate calibration data for the camera rig without interfering with the data captured by the visible light sensor,
   wherein the calibration data comprises changes in positions of the visible light sensor and the IR sensor.

2. The system of claim 1, wherein the data captured by the visible light sensor is processed to generate video image data.

3. The system of claim 1, wherein the IR source is configured to project the calibration pattern onto objects and people present within a capture volume.

4. The system of claim 3, wherein the data captured by the IR sensor is processed to generate geometry about the objects and people present within the capture volume.

5. The system of claim 1, wherein the visible light sensor comprises a red-green-blue (RGB) sensor.

6. The system of claim 1, wherein the processor is configured to direct the visible light source to project visible light and the IR source to project IR beam, during the entire capture period.

7. The system of claim 1, wherein the processor is configured to direct the visible light source to project visible light and the IR source to project IR beam, at different times during the capture period.

8. The system of claim 1, wherein the visible light sensor and the IR sensor are configured to at least partially overlap in position.

9. The system of claim 1, wherein the visible light sensor and the IR sensor are configured to be positioned within a single camera.

10. A method for capturing data from a camera rig with multiple sensors during a capture period and creating a common configuration for the multiple sensors, the method comprising:
    directing a visible light source to project visible light on objects and people present within a capture volume;
    directing a visible light sensor to capture the visible light reflected from the objects and people;
    directing an IR source to project a patterned IR beam on the objects and people within the capture volume;
    directing an IR sensor to capture the patterned IR beam reflected from the objects and people;
    processing the IR beam of the calibration pattern captured by the IR sensor to generate calibration data for the camera rig without interfering with the data captured by the visible light sensor,
    wherein the calibration data comprises changes in positions of the visible light sensor and the IR sensor.

11. The method of claim 10, wherein the visible light captured by the visible light sensor is processed to generate video image data.

12. The method of claim 10, wherein the patterned IR beam captured by the IR sensor is processed to also generate geometry about the objects and people present within the capture volume.

13. The method of claim 10, wherein directing a visible light source and directing an IR source comprise
  directing to project the visible light and the IR beam, during the entire capture period.

14. The method of claim 10, wherein directing a visible light source and directing an IR source comprise
  directing to project the visible light and the IR beam, at different times during the capture period.

15. A method for capturing data from a camera rig with multiple sensors during a capture period and creating a common configuration for the multiple sensors, the method comprising:
  directing a visible light source to project visible light on objects and people present within a capture volume;
  directing a visible light sensor to capture the visible light reflected from the objects and people;
  directing an IR source to project a patterned IR beam on the objects and people within the capture volume;
  directing an IR sensor to capture the patterned IR beam reflected from the objects and people;
  processing the IR beam of the calibration pattern captured by the IR sensor to generate calibration data for the camera rig without interfering with the data captured by the visible light sensor,
  wherein the calibration data comprises changes in distortions of the patterned IR beam as a camera angle relative to the surface changes.

\* \* \* \* \*